United States Patent [19]

Mohler

[11] 4,087,766

[45] May 2, 1978

[54] LASER HAVING BEAM TERMINATING MECHANISM

[75] Inventor: Galen E. Mohler, Los Altos, Calif.

[73] Assignee: Lexel Corporation, Palo Alto, Calif.

[21] Appl. No.: 703,858

[22] Filed: Jul. 9, 1976

[51] Int. Cl.² ............................................. H01S 3/02
[52] U.S. Cl. ............................... 331/94.5 M; 350/269
[58] Field of Search .................... 331/94.5 C, 94.5 D, 331/94.5 M; 350/269; 219/121 L

[56] References Cited

U.S. PATENT DOCUMENTS

| 3,369,101 | 2/1968 | Curcio | 219/121 L |
| 3,619,037 | 11/1971 | Pugh, Jr. | 350/269 |

*Primary Examiner*—William L. Sikes
*Attorney, Agent, or Firm*—C. Michael Zimmerman

[57] ABSTRACT

A laser is described having a protective mechanism for terminating its output beam without requiring the laser power to be disconnected. Such protective mechanism includes a barrier located within the laser optical cavity for movement between a position preventing the radiation oscillation responsible for lasing action and another position allowing the lasing action to take place. A feedthrough mechanism is included for transmitting motion imparted to an actuator external of the laser to motion of the barrier between its positions within the optical cavity. In the preferred embodiment, the feedthrough mechanism relies on a magnetic arrangement to insure that the hermetic isolation of the optical cavity from the atmosphere ambient to the laser is not deleteriously affected due to the necessity of transmitting motion from outside the optical cavity to its interior.

13 Claims, 8 Drawing Figures

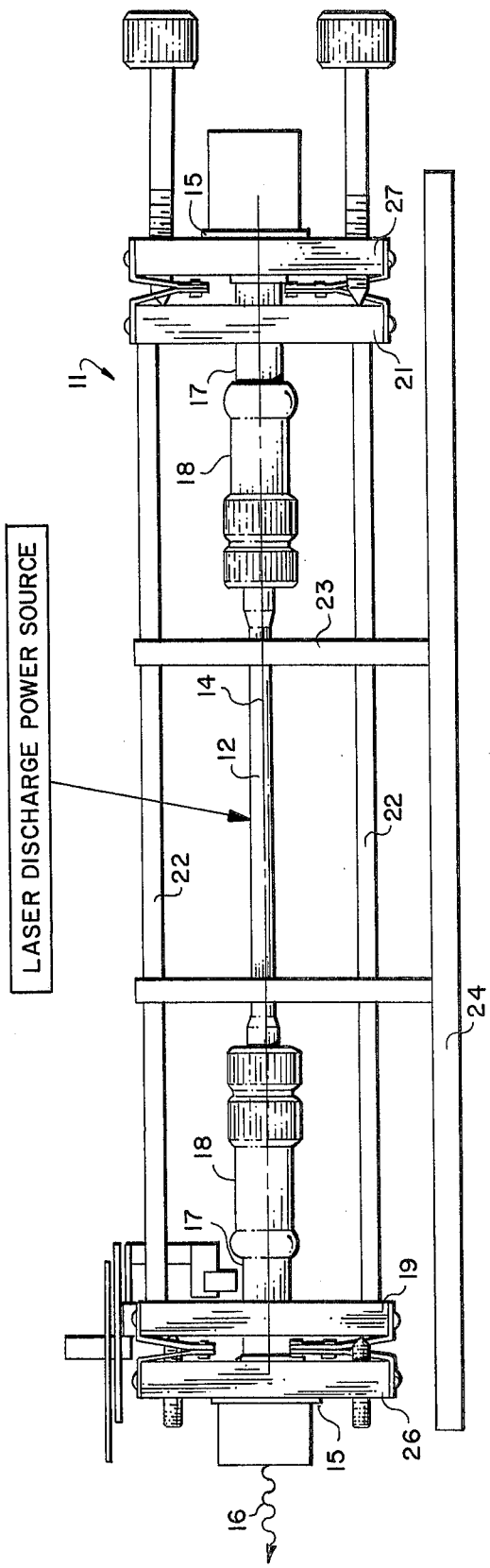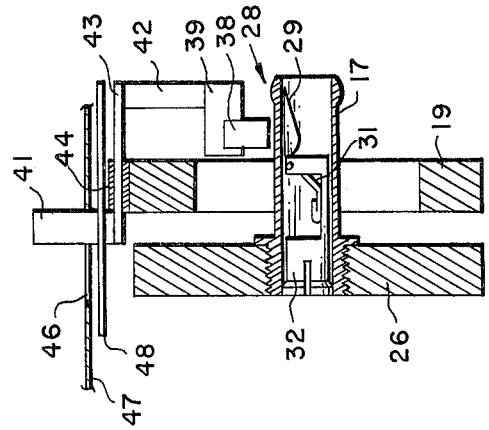

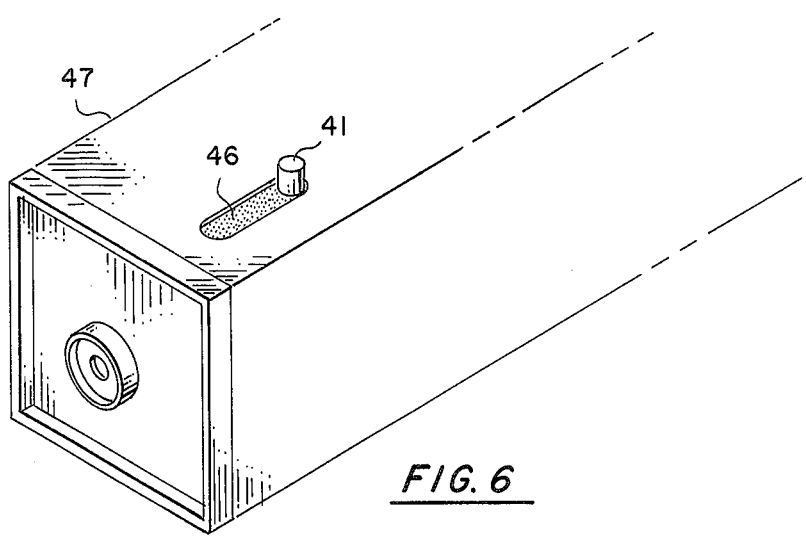
FIG. 6
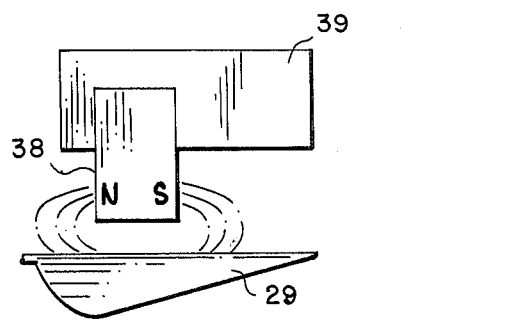
FIG. 4
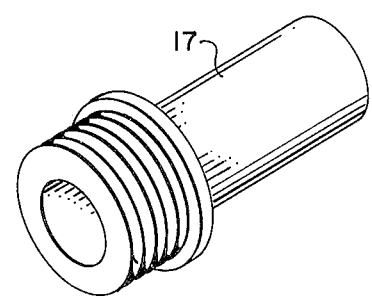
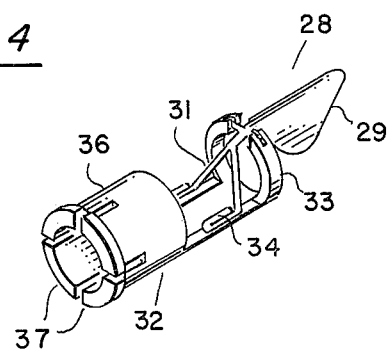
FIG. 5
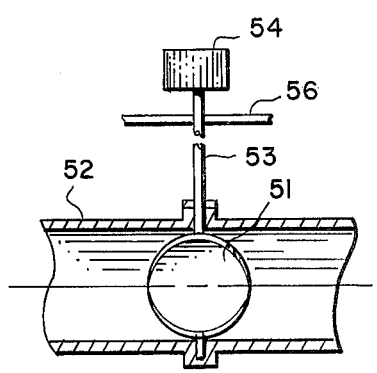
FIG. 7
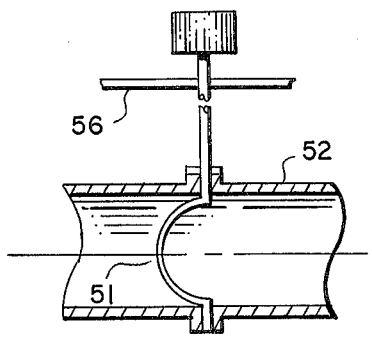
FIG. 8

LASER HAVING BEAM TERMINATING MECHANISM

BACKGROUND OF THE INVENTION

The present invention relates to lasers and, more particularly, to a laser having a protective mechanism for terminating its output beam without requiring the power for such laser to be disconnected.

For safety reasons, it is desirable to be able to prevent the output beam of a laser from issuing beyond the laser, without requiring termination of the power sustaining the lasing action. In this connection, whenever the power for a laser is turned on, the laser must warm up to thermal equilibrium before proper lasing action can be obtained. Thus, if the use of a laser is an intermittent use, as is often the case in research, it is common for the laser to be left running between uses in order to avoid the delay associated with warm-up times. This results in an increased chance of unintended exposure to the laser output beam. The likelihood of such an event happening would be materially decreased if means were included for terminating a laser beam without also having to terminate power to the laser.

The obvious approach to preventing a laser beam from issuing from a laser without turning off the power is to block the beam as it leaves the laser. Such a solution, however, is not as simple as it may seem. A laser beam is wholly made up of radiant energy which will be absorbed by any structure which effectively blocks the same. This means that a cooling arrangement or other energy dissipating system must be provided as part of the block in order to prevent it from being harmed by the energy of the output beam.

SUMMARY OF THE INVENTION

The present invention relates to a protective mechanism for terminating a laser output beam independently of the laser power source, while circumventing the problems normally associated with blocking such a beam. The invention accomplishes such termination by stopping the beam from being formed whenever it is not desired. It does this by interfering with the optical oscillation within the laser optical cavity necessary to sustain lasing action. To this end, the protective mechanism of the invention includes a barrier movable between a first position transverse to the laser optical axis between the opposed reflectors which oscillate the radiation along the optical axis, and a second position free of such optical axis allowing oscillation to sustain lasing action. The mechanism further includes an actuator accessible exteriorly of the laser for moving the barrier between such two positions.

As an additional salient feature, the actuator includes an arrangement which assures positive control of the barrier movement without affecting the hermetic isolation of the laser optical cavity from the ambient atmosphere. That is, the actuator of the preferred embodiment has a feedthrough arrangement which includes a magnet on one side of a non-paramagnetic wall separating the laser optical cavity from such ambient atmosphere which magnet is positioned to react magnetically with a paramagnetic body on the opposite side of the wall. Thus, motion applied to a handle of the actuator outside the laser optical cavity can be transmitted into such optical cavity without requiring a physical penetration of the wall. Most desirably, the barrier itself provides the paramagnetic material and is pivotally mounted within the optical cavity. Such barrier includes paramagnetic material on opposite sides of its pivotal mounting so that the positioning of the barrier at either of the positions is positively controlled by magnetic flux. Thus, the magnetic feedthrough arrangement holds the barrier in a selected position irrespective of the orientation of the laser relative to gravity.

The invention includes other features and advantages which will be described or will become apparent from the following more detailed description of a preferred embodiment.

BRIEF DESCRIPTION OF THE DRAWING

With reference to the accompanying two sheets of drawing:

FIG. 1 is an elevation view of a laser incorporating a preferred embodiment of the invention;

FIGS. 2 and 3 are enlarged elevation sectional views illustrating in more detail the preferred embodiment of the invention in two different positions;

FIG. 4 is an enlarged, somewhat schematic view of the magnetic feedthrough mechanism of the preferred embodiment;

FIG. 5 is an exploded, isometric view of the protective mechanism showing the configuration and relationship of the various parts thereof;

FIG. 6 is an isometric view of a laser with a standard housing illustrating the manner in which the protective mechanism is actuatable from exterior of the laser; and FIGS. 7 and 8 are section views of another preferred embodiment of the invention in two different positions.

DETAILED DESCRIPTION OF THE PREFERRED EMBODIMENT

Reference is first made to FIG. 1 in which an ion laser, generally referred to by the reference numeral 11, is illustrated incorporating the present invention. As is conventional, the laser 11 includes an elongated plasma tube or container 12 enclosing a lasable medium, i.e., quantum resonant particles, such as an ionized noble gas at a pressure of about 1 torr. As is also conventional and schematically indicated at 13, a power source and a discharge mechanism, such as an electrode, are provided for initiating an electrical discharge in the lasable medium. The result will be that optical radiation will be propagated along the axis 14 of the plasma tube, which radiation will pass through windows at the opposite ends of the plasma tube and be oscillated by a pair of opposed optical reflectors 15 at such ends back and forth through the tube a sufficient number of times to sustain lasing action. Mirror 15' is partially transparent to the optical radiation to permit the same to transmit a coherent light radiation output beam, represented at 16, from the laser.

Axis 14 as extended to the mirrors 15 is called the "optical axis" of the laser. The space between the mirrors 15 through which optical radiation or energy is oscillated is referred to in the art as the "optical cavity" of the laser, which optical cavity includes the interior of plasma tube 12.

The portion of the optical cavity exterior of the plasma tube, i.e., the space between the ends of the tube 12 and their associated mirrors, is enclosed at each end by tubular structures. Each of such tubular structures is composed of a pair of axially aligned tubes 17 and 18. Such tubes hermetically isolate that portion of the optical cavity which they contain from the atmosphere ambient to the laser, at the little or no difference in pressure which exists between such ambient atmosphere and the optical cavity atmosphere contained therein. The purpose of hermetically isolating the optical cavity is to maintain it dust-free and otherwise separated from the ambient atmosphere to reduce optical losses due to reflection and absorption.

An ion laser further includes structure, commonly called resonator structure, which defines the optical cavity and maintains the reflectors or mirrors at its opposite ends at set distances and in predetermined relative orientations. The resonator structure included as part of the laser 11 is the same as that described in my U.S. Pat. No. 3,864,029, the subject matter of which is hereby incorporated by reference. It includes a pair of rectangular reference plates 19 and 21 respectively positioned adjacent opposite ends of the laser optifcal cavity. Such plates are rigidly held in position relative to one another by a plurality (in this case, three) rods 22 extending therebetween. Rods 22 preferably are made from a material, such as metal alloy sold under the trademark "INVAR", which is dimensionally insensitive to thermal changes over the ambient temperature range to which such rods might be expected to be subjected during operation of the laser.

Rods 22 are connected between three of the four corners of the reference plates 19 and 21 to provide three-point relative rigidity between such plates. The rods 22 and, hence, the remainder of the laser are supported by uprights 23 projecting from a base 24. Uprights 23 also support the laser tube 12.

Reference plates 19 and 21, maintained mechanically rigid relative to one another, provide a reference base from which the optical reflectors 15 of the laser are mounted at opposite ends of the optical cavity. In this connection, each of the reflectors 15 is rigidly secured to an assoicated mounting plate 26 and 27, respectively positioned adjacent one of the reference plates 19 and 21. Each of such mounting plates is mechanically secured to its associated reference plate by the tuning bolt-leaf spring separator arrangement described and claimed in my previously mentioned U.S. Pat. No. 3,864,029. As brought out in such patent, this arrangement enables precise and stable angular orientation of the laser reflectors with respect to the optical axis. Since such arrangement and its operation is adequately described in my earlier patent, it will not be described in detail here.

Each of the tubes 17 is threadably received in its associated mounting plate as illustrated in FIGS. 2 and 3. The tubes 18 each receive an end of the discharge tube 12 as described in my earlier patent, and mate with its associated tube 17 via the ball joint construction also described in such patent.

In accordance with the invention, laser 11 also includes protective mechanism for terminating its output beam independent of operation of the power source. To this end, the laser includes a barrier within the optical cavity which can be made to interfere, when desired, with the optical oscillation necessary to sustain lasing action. As best illustrated in FIGS. 2, 3, & 5, the barrier is pivotally mounted within the tubular structure 17 secured to mounting plate 26. Such barrier, generally referred to by the reference numeral 28, includes a spoon-like blocking portion 29 on one side of its pivotal mounting, and counter-weight wire extensions 31 on the opposite side of such mounting.

Barrier 28 is pivotally supported within the tube 17 by a mounting insert 32. Such mounting insert 32 includes a pair of curved upright supports 33 which pivotally engage the barrier between the blocking portion 29 and the counter-weight portion 31. The support arms are in turn supported by longitudinal connections 34 extending from a sleeve plug 36 which tightly fits within tubular structure 17 to hold the mounting insert therein. As shown, such sleeve plug is slotted longitudinally in order to define spring fingers 37 which provide a spring fit to maintain the sleeve in position.

With the above construction, the barrier is mounted in tube 17 for pivotal movement between the position illustrated in FIG. 2 in which the blocking spoon 29 extends transverse to the optical axis 14 and blocks passage of optical energy which would otherwise oscillate between the reflectors 15, and the position illustrated in FIG. 3 in which the spoon barrier is adjacent the inner surface of the tube side wall out of the way or free of both the optical axis and the path of oscillating radiation through the tube 17. Spoon-like portion 29 is opaque to optical radiation to prevent transmission of the same through the tube 17 when it is in the position illustrated in FIG. 2. In this regard, it should be noted that once reflection of optical radiation between the reflectors is stopped, no further energy will be generated to be intercepted by the spoon barrier. Thus, the positioning of the spoon barrier within the optical cavity eliminates the necessity of the barrier being designed to absorb any significant amount of optical energy. The need for a cooling arrangement or other energy dissipating mechanism is thus circumvented. Positioning of the barrier between the output mirror 15' and the plasma tube assures that any collateral radiation emanating from tube 12 also will be blocked.

Spoon barrier portion 29 has a curvature which generally conforms to the curvature of the inner surface of the tube 17 so that when it is in the position shown in FIG. 3, the spoon barrier is completely removed from the path of optical radiation through the tube. Moreover, the counter-weight wires 31 are separated as shown in FIG. 5 to provide a space therebetween for the passage of optical radiation when the barrier is in the position illustrated in FIG. 3. Thus, such counter-weight wires will not interfere to any measurable degree with oscillation between the mirrors when the barrier is in its inoperative position.

As a salient feature of the instant invention, it includes an actuator for moving the barrier simply between its two positions without interfering with the hermetic isolation of the optical cavity from the atmosphere ambient to the laser. To this end, the actuator includes a motion feedthrough mechanism which relies on magnetic action to translate motion imparted to the actuator external of the laser to motion of the barrier within the optical cavity. In this connection, the tube 17 is constructed of a non-paramagnetic material, e.g., aluminum, through which magnetic flux is passable. The feedthrough mechanism includes a permanent magnet 38 which is positioned by a mounting block 39 on the outside of the wall of tube 17 adjacent the location of barrier 28 within such tube. The barrier itself is made of a paramagnetic material, e.g., a steel. The barrier thus acts as a paramagnetic body which will magnetically react with the flux of magnet 38, i.e., be magnetically attracted to the magnet.

As shown, mounting block 39 for the magnet 38 is connected to a lever handle 41 by an angle bracket 42. Such bracket includes an arm 43 slidably received within a sleeve block 44 on the upper peripheral edge of reference plate 19. Block 44 is oriented to direct translational movement of the arm 43 in a direction generally parallel to the axis of the tube 17. Lever handle 41 secured to the free end of the arm 43 extends upwardly through a slot 46 in the housing cover 47 (FIG. 6) for the laser. With this construction, when lever handle 41 is moved from the exterior of the laser longitudinally between the positions shown in FIGS. 2 and 3, the magnet 38 will move translationally along the tube 17 from one side of the pivotal mounting of barrier 28 to the other. This will result in the barrier being moved by magnetic reaction with the magent 38 between its two positions illustrated in FIGS. 2 and 3.

The counter-weight extension 31 serves a dual function. For one, it acts to counterbalance the weight of the spoon barrier portion 29 so that the magnetic flux needed to move the same is minimized. Thus, in spite of the distance separation of the magnet from the magnetic material of the barrier, a good snapping action between the two barrier positions is obtainable without the magnet being very massive. The other function of the counter-weight is to act as a paramagnetic body on the side of the pivotal mounting opposite spoon barrier portion 29 for reaction with such magnet to assure positive action. That is, when the barrier is in the blocking mode indicated in FIG. 2, it is held in such mode by interaction between the magnet 38 and the extension wires 31. The result is that operation of the feedthrough mechanism is not dependent on the particular orientation of the laser relative to gravity.

Magnet 38 is oriented relative to the blocking portion of the barrier to generally optimize the interaction of its magnetic flux with such barrier. That is, with reference to FIG. 4, it will be seen that the magnet is oriented with its north and south poles separated from one another in a direction generally parallel to the direction in which such magnet will move. Thus, the magnetic flux passing between such poles will, as indicated in FIG. 4, be intercepted by the spoon barrier portion 29 with a minimum distortion of the flux field, i.e., a minimum elongation of the flux field lines. This optimum orientation of the magnet aids in minimizing the amount of mass the magnet 38 must have in order to assure a positive "snapping action" to movement of the barrier. The actuator of the protective mechanism also includes a simple scheme for indicating to an operator the particular position of the barrier at any given time. That is, the lever handle 41 has an indication plate 48 secured to it for movement therewith beneath the cover 47. Such indication plate includes an indicia, such as a red coloring, which will be exposed when the lever is in the position shown in FIG. 3, indicating that the laser is "on" (at least insofar as the protective mechanism is concerned). Reference is made to FIG. 6 for a schematic showing of such an indication.

Although a magnetic feedthrough mechanism is preferred to assure that the hermetic isolation of the optical cavity is not impaired by the presence of the barrier, it will be recognized by those skilled in the art that other feedthrough mechanisms could be used. In this regard, FIGS. 7 and 8 show such an alternate arrangement. The barrier in such arrangement is a section of a tubular cylinder having a radius of curvature generally the same as that of the tubular structure 52 within which it is positioned. The tubular structure 52 separates the optical cavity from the atmosphere ambient to the laser within which it is contained. In this arrangement, the barrier is moved by rotation along an axis perpendicular to the optical axis for movement between the blocking position illustrated in FIG. 8 and the unblocking position illustrated in FIG. 7. To provide such rotation, the motion feedthrough means includes an axially rotatable rod which hermetically passes through the wall of the tube 52 via a conventional rotary seal. A manually graspable knob 54 is provided on the free end of rod 53 exterior of the housing cover 56 of the laser on which the protective mechanism is a part. Thus, manual rotation of the knob from the exterior of the laser will impart the desired rotation to the barrier 51.

Although the invention has been described in connection with a preferred embodiment thereof, it will be apparent to those skilled in the art that various changes and modifications can be made without departing from its spirit. It is therefore intended that the coverage afforded applicant be defined by the spirit of the invention as set forth in the claims.

I claim:

1. In a laser hsaving an optical cavity including a lasable medium contained between a pair of opposed optical reflectors which oscillate optical radiation along an optical axis through said lasable medium, with at least one of said reflectors being partially transparent to said radiation to transmit an output beam from said optical cavity; a protective mechanism for terminating said output beam independent of operation of the power source for said laser comprising a barrier moveable between a first position transverse to said optical axis between said optical reflectors to prevent the oscillation of optical radiation through said lasable medium and a second position free of said optical axis allowing oscillation by said optical reflectors of optical radiation through said lasable medium, and an actuator accessible exteriorly of said laser for moving said barrier between said first and second positions.

2. The laser of claim 1 wherein said optical cavity is separated substantially hermetically from the atmosphere ambient to said laser, and said actuator includes motion feed-through means to translate motion imparted to said actuator external of said laser to motion of said barrier within said optical cavity.

3. The laser of claim 2 wherein said motion feedthrough means includes an axially rotatable rod hermetically passing through a wall separating said optical cavity from said ambient atmosphere.

4. The laser of claim 3 wherein said motion feedthrough means further includes a manually graspable knob on said rod exterior of said laser for axially rotating said rod, said barrier being secured to the end of said rod within said optical cavity for movement between said first and second positions by said rotation of said rod.

5. The laser of claim 2 wherein said motion feedthrough means includes a magnet on one side of a nonparamagnetic wall separating said optical cavity from the atmosphere ambient to said laser, said magnet being positioned at a location on said side of said wall to react magnetically with a paramagnetic body on the opposite side of said wall; and a handle operatively secured to the one of said magnet and paramagnetic body exterior to said optical cavity for imparting a preselected motion thereto; the other of said magnet and paramagnetic body being positioned within the interior of said optical cavity to move said barrier between said first and second positions by magnetic reaction upon said preselected motion.

6. The laser of claim 5 wherein said lasable medium is enclosed within an elongated, sealed envelope which extends along said optical axis; said pair of opposed optical reflectors are spaced from said envelope; and a tubular structure extends between each of said optical reflectors and an adjacent end of said elongated envelope enclosing the optical axis of said optical cavity, said tubular structure including said non-paramagnetic wall through which magnetic flux is passable between said magnet of said motion feedthrough means and said paramagnetic body.

7. The laser of claim 6 wherein said barrier is pivotally mounted within said optical cavity for movement between said first and second positions, and comprises a blocking portion for preventing said optical radiation on one side of said pivotal mounting and a counterweight on the opposite side of said pivotal mounting facilitating movement by said magnet of said barrier between said positions.

8. The laser of claim 7 wherein both said counterweight extension and said blocking portion of said barrier are of a paramagnetic material, and said magnet is located exteriorly of said cavity and is secured thereat to said actuator, said actuator being adapted to move said magnet translationally along said optical cavity from one side of said pivotal mounting to the other to pivot said blocking portion into one of said first and second positions by attraction of said extension and to the other of said positions by attraction of said blocking portion.

9. The laser of claim 8 wherein said magnet is oriented relative to the blocking portion of said barrier to generally optimize the interaction of magnetic flux produced by said magnet with said barrier.

10. In a laser which produces along an optical axis an output beam of coherent radiation, a protective mechanism for terminating said output beam independent of operation of the power source for said laser comprising:
   A. a barrier movable between a first position transverse to and blocking said output beam and a second position free of said output beam; and
   B. an actuator accessable exteriorly of said laser for moving said barrier between said first and second positions, said actuator including motion feedthrough means to translate motion imparted to said actuator external of said laser to motion of said barrier between said first and second positions, said feedthrough means including:
   (1) a magnet positioned on one side of a non-paramagnetic wall at a location at which it will react magnetically with a paramagnetic body on the opposite side of said wall; and
   (2) a handle operatively secured to the one of said magnet and paramagnetic body exterior of said laser for imparting a preselected motion thereto, the other of said magnet and paramagnetic body being positioned to move said barrier between said first and second positions by magnetic reaction upon said preselected motion.

11. The laser of claim 10 further including a tubular structure separating the portion of said optical axis at said motion feedthrough means from the atmosphere ambient to said laser, said tubular structure including said non-paramagnetic wall through which magnetic flux is passable between said magnet of said motion feedthrough means and said paramagnetic body.

12. The laser of claim 11 wherein said barrier is pivotally mounted within said optical cavity for movement between said first and second positions, and comprises a blocking portion for preventing said optical radiation on one side of said pivotal mounting and a counterweight on the opposite side of said pivotal mounting facilitating movement by said magnet of said barrier between said positions.

13. The laser of claim 12 wherein both said counterweight extension and said blocking portion of said barrier are of a paramagnetic material, and said magnet is located exteriorly of said cavity and is secured thereat to said actuator, said actuator being adapted to move said magnet translationally along said optical cavity from one side of said pivotal mounting to the other to pivot said blocking portion into one of said first and second positions by attraction of said extension and to the other of said positions by attraction of said blocking portion.

* * * * *